S. SWINFORD.
SEED PLANTER.
APPLICATION FILED OCT. 11, 1916.
1,219,361.
Patented Mar. 13, 1917.
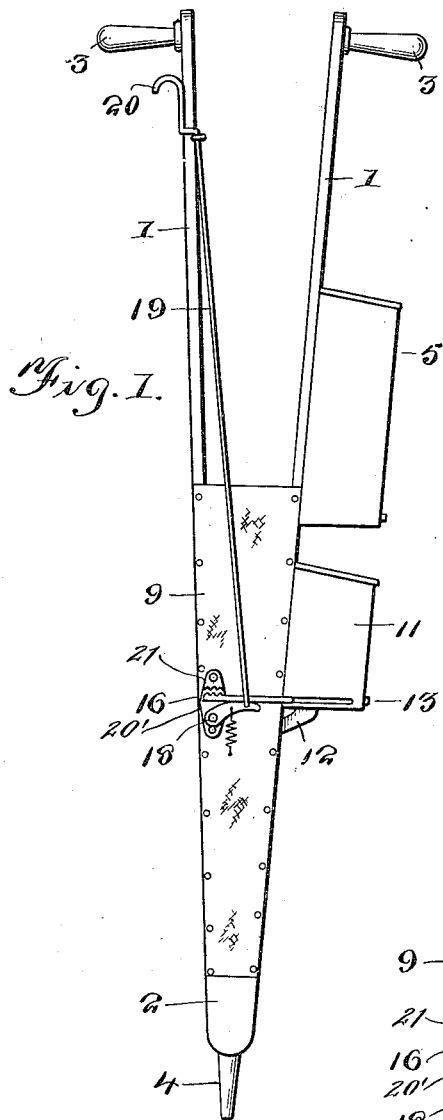
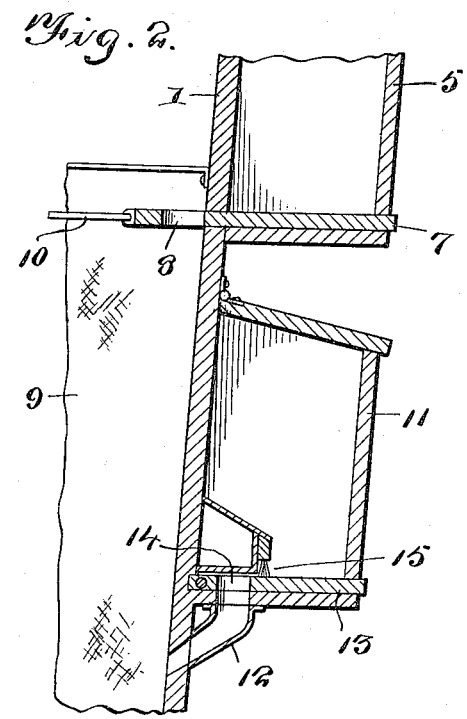
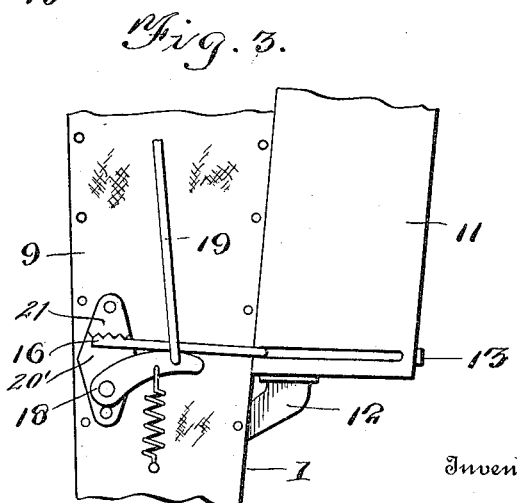
Inventor
Stanley Swinford
By Victor J. Evans
Attorney
Witnesses

UNITED STATES PATENT OFFICE.

STANLEY SWINFORD, OF HINTON, KENTUCKY.

SEED-PLANTER.

1,219,361.

Specification of Letters Patent. Patented Mar. 13, 1917.

Application filed October 11, 1916. Serial No. 125,047.

*To all whom it may concern:*

Be it known that I, STANLEY SWINFORD, a citizen of the United States, residing at Hinton, R. No. 1, in the county of Harrison and State of Kentucky, have invented new and useful Improvements in Seed-Planters, of which the following is a specification.

This invention relates to attachments adapted to be applied to hand corn planters and it consists in the novel features hereinafter described and claimed.

An object of the invention is to provide an attachment in the form of a hopper adapted to be applied to the side of a hand operated corn planter and which may be used for depositing seed as for instance pumpkin or beans at the same time that the seed corn is deposited. The said hopper is provided at its bottom with a slide adapted to remove the seed from the hopper and under normal conditions the said slide remains inactive while the planter is being used for depositing seed corn. However when it is desired to plant other seed simultaneously with the corn a rod is pulled which in turn operates mechanisms whereby the said slide is rendered active with the side of the planter and moves with the corn dropping slide and consequently both kinds of seed are deposited.

In the accompanying drawing:—

Figure 1 is a side elevation of the planter with the attachment applied.

Fig. 2 is a fragmentary sectional view of the same;

Fig. 3 is an enlarged fragmentary side elevation of parts of the same.

As illustrated in the accompanying drawings, the corn planter comprises side members 1 which are pivotally connected at their lower ends with a member 2 in the usual manner. The members 1 are provided at their upper ends with outstanding handles 3 and the member 2 is provided at its lower end with a spout 4. A hopper 5 is attached to the outer side of one of the members 1. A slide 7 is movably mounted in the lower portion of the hopper 5 and is provided with an opening 8 adapted to move from within the hopper into the bellows portion 9 which is connected with the lower part of the members 1 and extends to the member 2. A rod 10 connects the slide 7 with one of the members 1 and consequently when the upper ends of the members 1 are pressed together the opening 8 in the slide 7 is moved into the hopper 5 and may receive the grain which is in the said hopper. This grain or seed may be corn. When the upper ends of the members 1 are moved away from each other the opening 8 is moved within the bellows 9 and the said seed is carried from the hopper 5 and is deposited into the bellows 9 through which it gravitates into the member 2 and passes out of the spout 4 into the ground in the usual manner.

The attachment which constitutes the subject matter of the present invention comprises a hopper 11 which is applied to one of the members 1 just below the hopper 5. The said hopper 11 is provided at its bottom with a spout 12 which leads into the bellows member 9 through that member 1 to which the said hopper 11 is applied. A slide 13 is movably mounted in the lower portion of the hopper 11 above the upper end of the spout 12. The said slide 13 is provided with an opening 14 and bristles 15 are located in the hopper 11 and are adapted to hold back the excess of seed from the opening 14. A rack bar 16 is connected with the slide 13. A pawl 18 is pivotally mounted upon a plate 20' attached to the edge of one of the side members 1 and the lower end of a rod 19 is connected with the said pawl. The rod 19 is provided at its upper end with a hook 20 which is located in the vicinity of the handle 3 mounted upon the said side member 1. The hopper 11 is adapted to contain seed which should be planted at desired intervals simultaneously with the dropping of the seed from the hopper 5. The plate 20' is provided with teeth 21 adapted to be engaged by the rack 16 when the pawl 18 is swung up as shown in Fig. 3.

Assuming that it is desired to plant pumpkin seed with the seed from the hopper 5 at intervals of a third hill of grain which is planted from the said hopper 5, the rod 19 is moved longitudinally by passing the finger under the hook 20. Thus the pawl 18 is moved into engagement with the rack bar 16, which in turn engages the teeth 21, and when the side members 1 are moved toward each other the opening 14 in the slide 13 is moved into the hopper 11, whereby the seed from the hopper 11 may enter the said opening 14. When the members 1 move away from each other the said opening moves over the spout 12 and the seed falls from the spout into the bellows member 9 and thence into the member 2 and through the spout 4 into the ground at the same time that the seed from the hopper 5 is planted.

When it is desired that the slide 13 shall remain inactive pressure is removed from the rod 19 whereby the pawl 18 swings down the teeth of the rack bar 16 to disengage the teeth 21 and consequently the seed from the hopper 11 will not deposit.

From the foregoing description taken in conjunction with the accompanying drawing it will be seen that a planter attachment of simple and durable structure is provided and that the same may be easily and quickly manipulated to plant different kinds of seed at the same time.

Having described the invention what is claimed is:—

In combination with a planter comprising movable side members, an attachment comprising a hopper having a spout which passes transversely through one of the side members, a slide movably mounted in the hopper and having an opening, a rack bar connected with the slide, a pawl pivotally mounted upon the other side member and a rod connected with the pawl and adapted to be manipulated to move the pawl into engagement with the rack bar, whereby the bar is operatively connected with one of the side members.

In testimony whereof I affix my signature.

STANLEY SWINFORD.

Copies of this patent may be obtained for five cents each, by addressing the "Commissioner of Patents, Washington, D. C."